(12) United States Patent
Duxbury

(10) Patent No.: US 8,380,795 B2
(45) Date of Patent: Feb. 19, 2013

(54) METHOD OF FILTERING SECTIONS OF A DATA STREAM

(75) Inventor: Neil Duxbury, Westbury (GB)

(73) Assignee: Roke Manor Research Limited, Romsey, Hampshire (GB)

( * ) Notice: Subject to any disclaimer, the term of this patent is extended or adjusted under 35 U.S.C. 154(b) by 672 days.

(21) Appl. No.: 12/505,179

(22) Filed: Jul. 17, 2009

(65) Prior Publication Data

US 2009/0282119 A1 Nov. 12, 2009

Related U.S. Application Data

(63) Continuation of application No. PCT/GB2008/000172, filed on Jan. 18, 2008.

(30) Foreign Application Priority Data

Jan. 18, 2007 (GB) .................................. 0700926.9
Jan. 18, 2007 (GB) .................................. 0700928.5

(51) Int. Cl.
*G06F 15/16* (2006.01)
*G06F 15/173* (2006.01)

(52) U.S. Cl. ....................... 709/206; 709/224

(58) Field of Classification Search .......... 709/204–207, 709/223–225
See application file for complete search history.

(56) References Cited

U.S. PATENT DOCUMENTS

| 5,452,451 | A | 9/1995 | Akizawa et al. | |
|---|---|---|---|---|
| 5,890,103 | A | 3/1999 | Carus | |
| 7,500,265 | B2 * | 3/2009 | Encinas et al. | 726/22 |
| 8,095,602 | B1 * | 1/2012 | Orbach | 709/206 |
| 2002/0188926 | A1 | 12/2002 | Hearnden | |
| 2004/0210640 | A1 * | 10/2004 | Chadwick et al. | 709/207 |
| 2007/0118904 | A1 * | 5/2007 | Goodman et al. | 726/22 |
| 2007/0198642 | A1 * | 8/2007 | Malik | 709/206 |
| 2007/0220607 | A1 * | 9/2007 | Sprosts et al. | 726/24 |
| 2008/0256210 | A1 * | 10/2008 | Malik | 709/206 |
| 2009/0064330 | A1 * | 3/2009 | Shraim et al. | 726/22 |

FOREIGN PATENT DOCUMENTS

| EP | 0 893 779 A1 | 1/1999 |
|---|---|---|
| EP | 0 971 294 A2 | 1/2000 |
| GB | 1148856 | 4/1969 |

OTHER PUBLICATIONS

International Search Report dated Apr. 14, 2008 (Two (2) pages).
International Preliminary Report on Patentability dated Mar. 13, 2009 (Seven (7) pages).
GB Search Report dated Apr. 12, 2007 (One (1) page).

* cited by examiner

*Primary Examiner* — Joshua Joo
(74) *Attorney, Agent, or Firm* — Banner & Witcoff, Ltd.

(57) ABSTRACT

A method of filtering sections of a data stream involves determining a set of characters of interest, testing each section of the data stream for the presence of one or more of the set of characters of interest and extracting sections in which at least one of the characters is present.

14 Claims, 13 Drawing Sheets

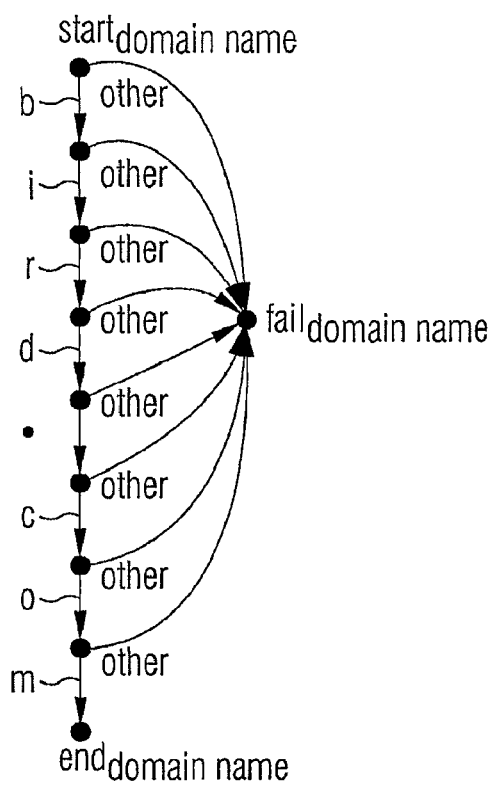
FIG 2B
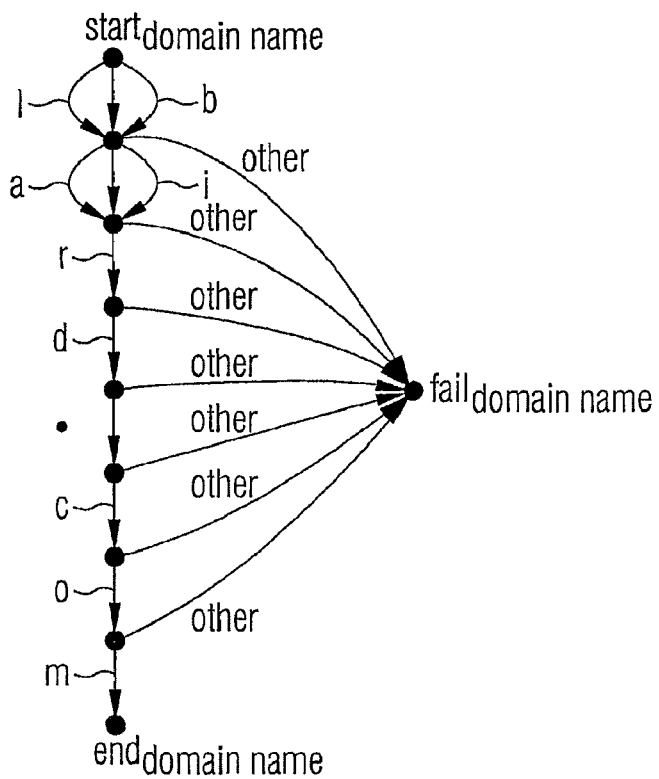
FIG 3 Rolled out domain name

METHOD OF FILTERING SECTIONS OF A DATA STREAM

CROSS-REFERENCE TO RELATED APPLICATIONS

This application is a continuation of PCT International Application No. PCT/GB2008/000172, filed Jan. 18, 2008, which claims priority under 35 U.S.C. §119 to Great Britain Patent Application No. 0700926.9, filed Jan. 18, 2007, and Great Britain Patent Application No. 0700928.5, filed Jan. 18, 2007, the entire disclosures of the aforementioned applications herein expressly incorporated by reference.

The present application is also related to U.S. patent application Ser. No. 12/505,147, entitled "A Method of Extracting Sections of a Data Stream" and filed on even date herewith, which is a continuation of PCT International Application No. PCT/GB2008/000184, filed Jan. 18, 2008, which claims priority under 35 U.S.C. §119 to Great Britain Patent Application No. 0700926.9, filed Jan. 18, 2007, and Great Britain Patent Application No. 0700928.5, filed Jan. 18, 2007, the entire disclosures of the aforementioned applications are herein expressly incorporated by reference.

BACKGROUND AND SUMMARY OF THE INVENTION

This invention relates to a method of filtering sections of a data stream, in particular where the data stream comprises end point identifier data which has already been extracted from a more general data stream.

Specific examples of this are SPAM filtering based on email addresses, or extraction of web data based on URLs, however the method of filtering is applicable to any set of data defined by an end point identifier.

In the example of email, lookup against a dictionary of target addresses is important in SPAM filtering for rejecting mail from known SPAM agents. However, the process of email address lookup against a target database can prove to be a significant performance bottleneck. The principal reason for this performance bottleneck is the processing overhead associated with checking whether all email addresses extracted from a data sample are in a database of target email addresses. In reality the probability of obtaining a hit on the database with an arbitrary email address is <1%. Consequently, 99% of the lookup effort is spent rejecting potential items.

In accordance with the present invention, a method of filtering sections of a data stream comprises determining a set of characters of interest; testing each section of the data stream for the presence of one or more of the set of characters of interest; and extracting sections in which at least one of the characters is present.

The present invention reduces the number of occasions when a look up must be carried out by excluding from the look up stage, sections of the data stream which do not satisfy a minimum co-incidence with characters in an end point identifier.

Preferably, the method further comprises determining a further set of characters of interest; testing for at least one character from the further set of characters in the portion of the data stream; and extracting sections in which at least one of the characters from the further sets of characters is also present in the section.

The method can be continued through several iterations by setting additional character sets.

Preferably, the method comprises testing for the one or more of the set of characters in a predetermined order.

By requiring the characters to appear in a particular order, fewer incorrect extractions are made, but at a cost of an increased memory requirement whilst the extraction processing is undertaken.

Preferably, a skip function is applied, so that only predetermined characters in each section are tested against the set of characters of interest.

This allows testing of a specific character, such as the first or last character, without first testing all the characters leading up to that one.

Preferably, the first and last characters of a section are compared with the first and last characters of the set of characters of interest and the section extracted if there is a match.

This reduces the likelihood of an incorrect match, using well defined test characters.

Preferably, the method comprises determining additional sets of characters of interest and testing for one or more of the set of characters in more than one set.

By testing for different character sets in parallel, throughput is increased despite some less valid sections being extracted as a result.

Preferably, the section comprises an end point identifier, such as a domain name; an email address; a uniform resource locator; a telephone number; or a data and time.

The end point identifiers are not limited to these types, although they tend to be the most commonly searched ones, and the invention is equally applicable to filtering other types of end point identifier.

Preferably, the extracted sections are stored in a store.

Preferably, the extracted sections are input to a look up table and compared with specific stored end user identifiers; wherein sections which match the specific end user identifiers are stored and those which do not match are discarded.

BRIEF DESCRIPTION OF THE DRAWING FIGURES

An example of a method of filtering sections of a data stream will now be described with reference to the accompanying drawings in which:

FIG. 2b illustrates a rolled out monogram domain name state machine for the email address big@bird.com;

FIG. 3 represents multiple rolled out domain names for the email addresses big@bird.com and big@lard.com;

DETAILED DESCRIPTION

Figure 1:
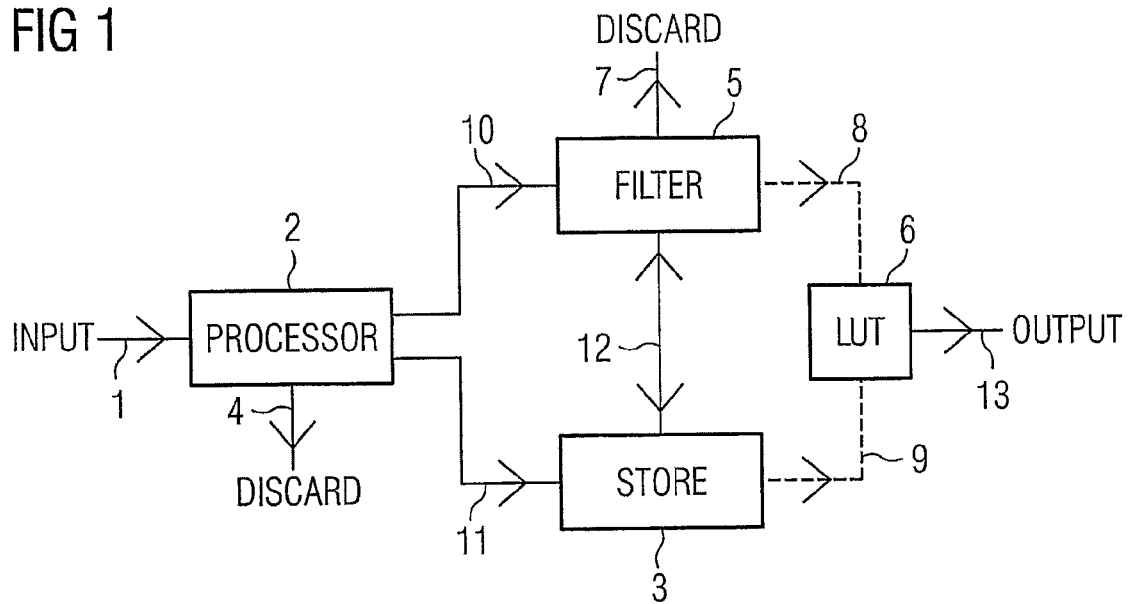
FIG. 1 is a block diagram of a typical system in which the method of the present invention is applied.

FIG. 1 illustrates a typical system for operating the method of the present invention. An input data stream 1 which could be from a store (not shown), or a real time data source, is input to a processor 2 which carries out an extraction stage. Whenever a section of the data stream satisfies the test criteria for extraction, the section is output 11, 10 to a store 3, or a filter 5. Data which is not extracted is discarded 4, although the discarded data steam could be subjected to additional tests, for example for a different specific label, or end user identifier. The method of the present invention is then applied to filter the sections which have been extracted and stored. A data stream formed of the extracted sections from the store 3 is input 12 to the filter 5 and those sections which are filtered are either stored again in the store 3, or sent on 8 for further processing, such as a lookup comparison 6. Sections which are not extracted in the filter stage are discarded 7. Thus, the extracted and filtered sections of the data stream may be obtained 9 from the store 3, or as an output directly 8 to the look up stage 6.

Thus, the present invention reduces this effort by reducing the number of items that are presented to the database for the look up comparison by filtering the extracted end point identifiers based on the contents of a target dictionary of the database. Another option is to combine the extraction and filtering stages (2, 5), then store (3) the extracted, filtered data, or pass it directly to the comparison stage (6), so that look up is only performed when the likelihood of success is increased.

A first example of a method according to the present invention describes filtering a data stream for an email address from a specific service provider before the comparison stage where a check for individual email addresses can be made. Although the example relates specifically to email addresses the techniques employed can be used to identify many other structured forms of data, such as URI/URL identification, domain names, telephone numbers, dates and times. Other examples are Session Initiation Protocol (SIP) URI identification; E.164 telephone number detection; Tag detection in other data formats; IP addresses, port range, protocol and session identifier detection; xml data structures, xml objects; HTML structures and objects; and detection of content types and identification of content from packet payloads.

Conventionally, all email addresses in a sample were looked up one by one. This has the drawback that around 99% of the addresses presented to the lookup phase are not in the dictionary. Thus, the lookup algorithm spends most of its time rejecting potential matches. Email address lookup is a two stage process involving first extraction and then comparison of the extracted email against a database containing target email addresses. Extraction of email addresses can be carried out using any conventional method, which typically uses the character set defined by the standards for identifying an email address. The present invention effectively decreases the number of comparisons that must be made against the database by performing a filtering stage as part of the email address extraction phase, or by filtering data which has been previously extracted before the look up stage is carried out.

However, for the comparison, or lookup, phase only specific email addresses are required. A set of characters used to form a set of targeted email addresses are highly unlikely to cover the complete range of allowable characters defined by the standards. Consequently, the method of the present invention requires only that some or all of the character set defined by the target dictionary containing the target email addresses is recognised, rather than that defined by the standards. In this scenario the absence of the full spectrum of valid characters in the user and domain name parts means that either fewer email addresses are identified by the extraction algorithm, if the filtering is incorporated into this, or fewer are passed from the extracted email addresses to the look-up stage. However, supporting the addresses defined in the dictionary also ensures that those addresses of interest are successfully identified so they can be passed onto the lookup stage. This reduces the number of items that are passed on to the full lookup phase and thus speeds up the overall pipeline of extraction and lookup.

In general the present invention restricts the set of characters that can appear in an email address to those that appear in the target dictionary of the look up stage. Any detection algorithm based on this restricted set then provides enhanced performance as the probability of finding an email address composed of the restricted set is less than the probability of finding an email address composed of the full set. Thus, for an arbitrary sample fewer instances are passed on to the full lookup stage which enhances the overall performance. This methodology is particularly useful when only looking for a small number of domains e.g. roke.co.uk, where there may be an increase in throughput in the extraction phase of about 20%.

Figure 2A:
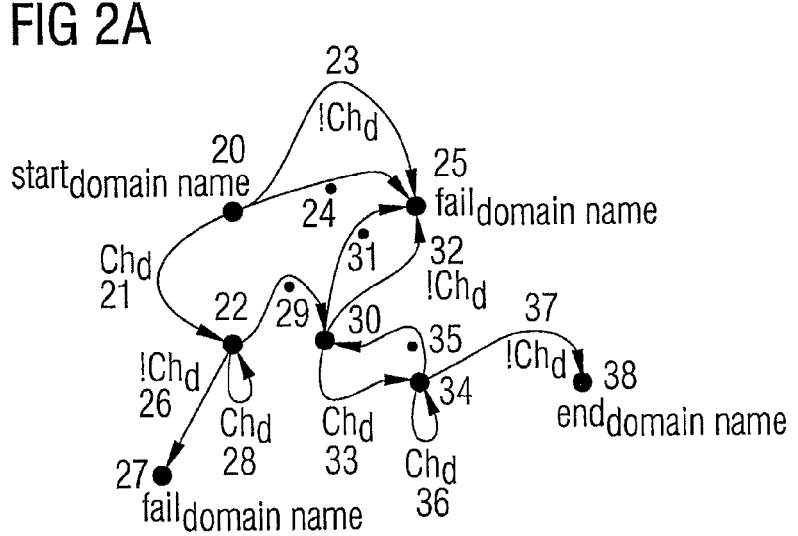
FIG. 2a illustrates a compressed domain name state machine.

State machines may be generated that recognise the domain and user name sections, so that the structure of the dictionary entries is incorporated into the identification and extraction phase, in a similar manner to that described in our co-pending application Reference 2006P23116. In this instance the range of characters in the set $Ch_d$ is defined by the range of characters found in the target dictionary, rather than the complete range of valid domain name characters. As all emails include a domain name, the filtering of emails is done in accordance with the domain name example given below. An illustration of the state machines for domain name identification is shown in FIG. 2a for a compressed domain name and FIG. 2b for a rolled out domain name. A method to incorporate the structure as well as the character set of the dictionary entries is to un-roll the monogram state machine to make it more specifically aligned to the target dictionary. If a single valid domain name character is $Ch_d$ then an example of this modification is illustrated for the monogram domain name state machine shown in FIG. 2.

In FIG. 2a, from $start_{domain\ name}$ 20, if a valid domain name character $Ch_d$ 21 is identified, the test moves on to the next point 22. If an invalid character 23, or bridge character 24, are found, the test fails 25. From point 22, an invalid character 26 causes a fail 27 and a valid character 28 loops back on itself, but a bridge character 29 moves the test on to the next point 30. From point 30 a bridge character 31, or an invalid character 32 cause a fail 25, whereas a valid character 33 moves on to the next point 34. A bridge character 35 moves back to point 30, a valid character 36 loops back on itself to point 34 and an invalid character 37 moves to the end point, $end_{domain\ name}$ 38. In this instance the $Ch_d$ defined for the compressed domain name is the set containing the characters {b, i, r, d, c, o, m} in FIG. 2b. As can be seen, the existing domain name state machine is merely the compressed representation in FIG. 2a of the rolled out version of FIG. 2b, i.e. all the transitions in the rolled out state machine are placed onto a few states. The compressed variant of the state machine gives improved selectivity by narrowing the valid character set. The rolled out variant gives higher selectivity by narrowing the character set and imposing some structure on the email address i.e. certain characters can only appear in certain places. In general this method provides higher throughput as the probability of finding '@b'<<'@ X' (where X is a valid domain name character defined by the standards) also the probability of finding the sequence:

@b ir d. co mX<< @any.any.any etc

The increased number of states means that fewer candidate email addresses will be passed on to the look up stage which enhances the throughput of the extraction/lookup pipeline.

Figure 4:
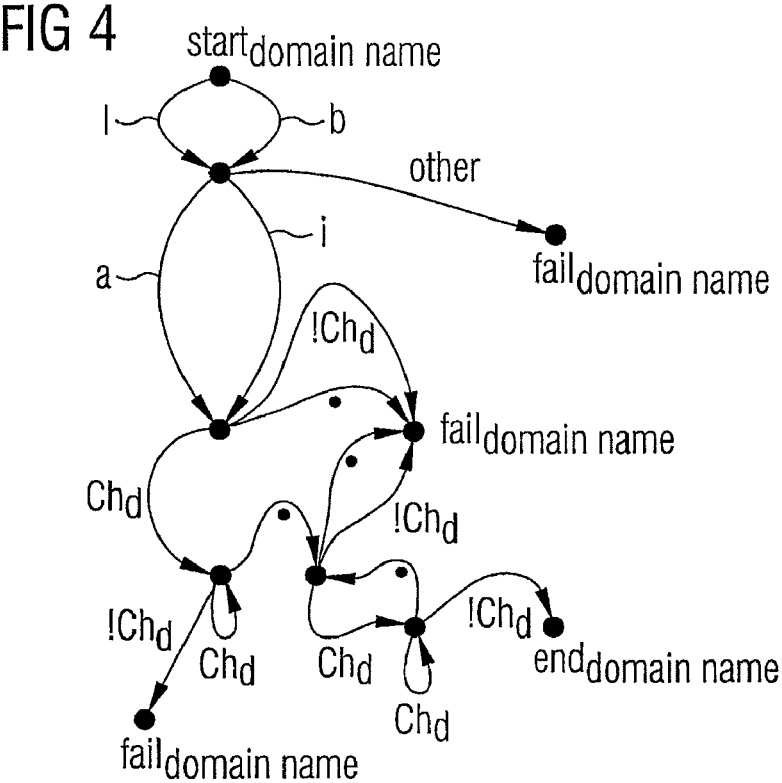
FIG. 4 shows partial roll out of a domain name state machine for the email addresses big@bird.com and big@lard.com.

In its simplest form multiple addresses are represented by adding additional outgoing paths to each node in the state machine as illustrated in FIG. 3. FIG. 3 illustrates how additional transitions are mapped onto the existing states. Thus, rather than just accepting the characters b and i as valid in the first two steps, the letters 1 and a are treated as equally valid and do not result in rejection. As can be seen the filter is not perfect as will let through addresses that are not in the dictionary for example bard.com or lird.com are also valid paths through the state machine. However, the filter still rejects a large fraction of the email addresses that are passed to it. Representing a large number of transitions in the state machine can greatly increase its size. This expansion has implications in terms of the amount of memory required to implement the technique and can affect the practical performance of the algorithm. These issues can be managed by performing a partial roll out of the state machine as shown in FIG. 4.

In effect the resulting state machine says find email addresses whose domain name is prefixed with the sequences in the set {bi, ba, li, la} and where the remaining suffix contains the characters in the set {rd.com} i.e. the end of the email address is compressed into a reduced number of states and the prefix is expanded to give enhanced filtering. This approach effectively limits the amount of branching that can occur and simplifies the implementation of the approach. It is possible to incorporate the character based filtering describing above and enhance it with a filter based on the structure (the sequence of the characters in the dictionary email addresses) of the target addresses contained in the dictionary.

Figure 5:
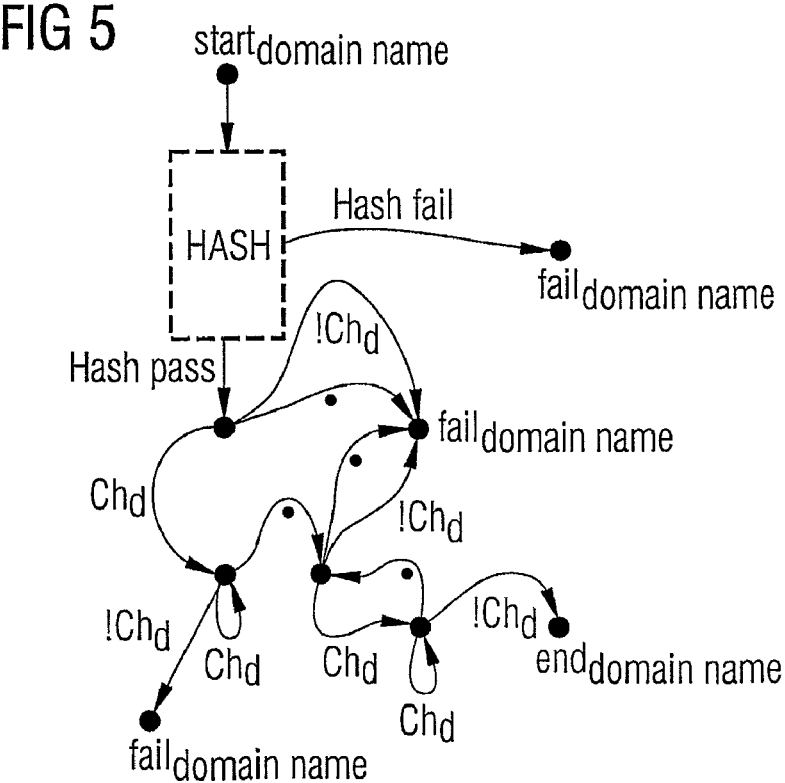
FIG. 5 illustrates a prefix hash with tail end state machine.

Another option is to replace a lookup over the first four characters, as described above, with a hash over the first 4 or more characters of the email address as shown in FIG. 5. A simplistic XOR based hash over the four characters following the X@ or @X sequence yields similar rejection and throughput to the state machine methodology. A more complex or deeper hash could be used at the expense of additional processing. Thus, the structure of the email address is expressed by using a hash function.

The state machine based pre-filtering method described previously does not make full use of the underlying structure contained by the email addresses in the target dictionary. In particular the mapping of several edges to a single vertex allows emails such as: big@lird.com to defeat the filter. This deficiency can be addressed by adding additional vertices to the compressed or full form of the state machine. This is illustrated for the domain name state machine in FIG. 6. Only if the first two characters are la or bi will the match be valid. Other combinations fail. This completely obviates the need for the lookup stage as the lookup and identification of an email address within the dictionary are done simultaneously. The only drawback of fully expanding the dictionary into a state machine is the memory requirement. However, this is not a significant limitation as the cost of memory comes down. In this modification to the approach the lookup and extraction algorithms are merged so that the lookup is performed as an email address is extracted. Consequently, there is no longer any need for the lookup phase. Typically, this design results in the highest performance.

Figure 6:
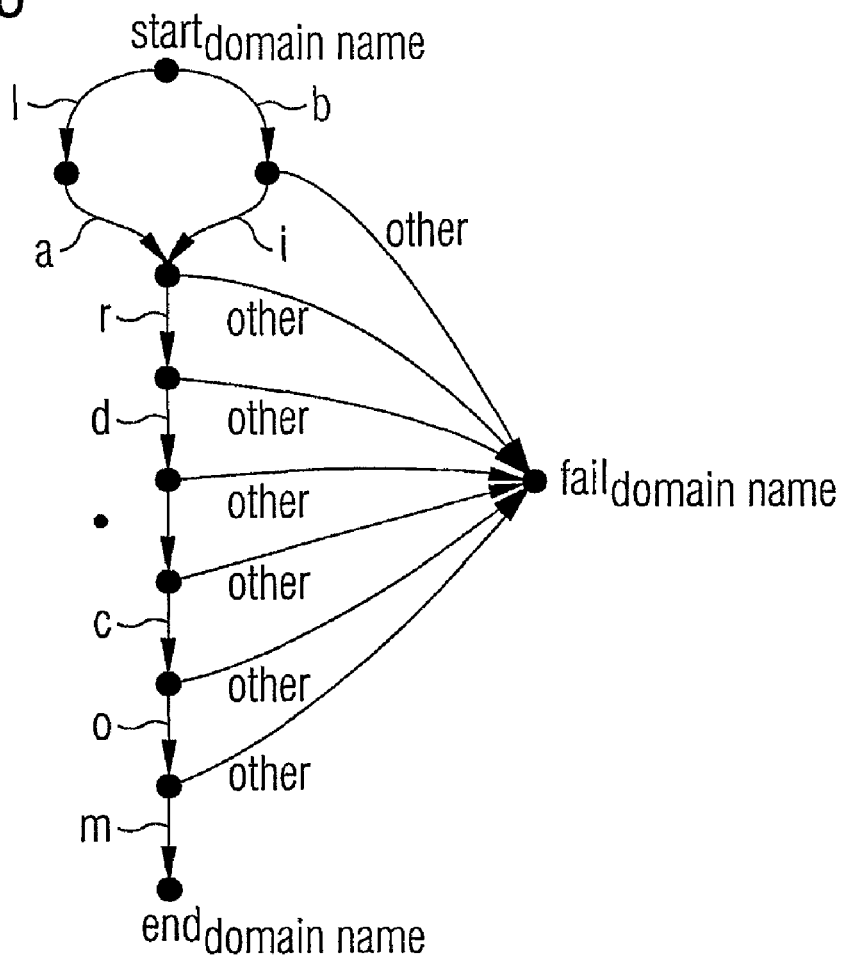
FIG. 6 illustrates the addition of additional vertices to the domain name state machine to enforce greater structure.
Figure 7:
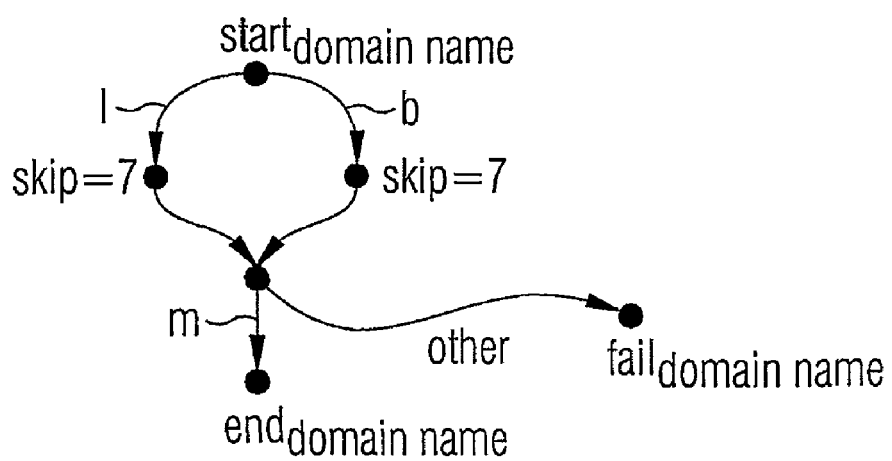
FIG. 7 shows a path compressed version of the domain name state machine.

The known method of 'path compression' can also be applied to the above approach. Although this would still require a follow on look up stage the advantage of this method is that it would greatly reduce the amount of memory required to represent the set of dictionary email addresses. A path compressed version of the state machine shown in FIG. 6 is illustrated in FIG. 7. Within the path compressed variant of the data structure a skip value is added to each internal vertex. The skip value allows to algorithm to move forward and check the only possible ending for the appropriate branch. A mismatch at this position leads to rejection, whereas a match passes the filter.

This modification saves memory by removing the internal nodes and minimises the number of characters that need to be looked at to determine if the email address is worth looking up. This modification greatly reduces the number of comparisons that need to be made in the pre-filter and also significantly improves the pre-filtering for large dictionaries. Use of this method is expected to reject a large number of the candidate email addresses before they are looked up.

The present invention introduces a filtering stage into the email address extraction phase in order to avoid unnecessary comparisons against the target email address database, or as a subsequent step before the comparison stage, so increasing the overall performance of the extraction lookup pipeline by reducing the number of items that are passed on to the lookup stage. As the lookup stage is the slowest point in the pipeline reducing the number of times it is called upon effectively increases the overall throughput.

The filtering can be achieved in a number of ways including filtering based on a restricted character set, which increases performance by utilising the reduced character set defined by the dictionary entries when compared to the set defined in the standards. The reduced set means that hitting an email address is less likely. Alternatively, filtering based on a restricted character set is combined with using the structure of the items in the target dictionary. The addition of structure to the filter means that hitting an email address is less likely. The structured filtering may use a state machine, hashing, or a tree structure. The tree structure can also be applied to the combined lookup and extraction algorithm, so doing away with the lookup stage all together and performing the extraction and lookup simultaneously. Filtering based on trees with skip vertices reduces the memory overhead of implementing the tree based approach, whilst providing similar if not better statistics for email hit rate as the character and structure based approaches.

Figure 8:
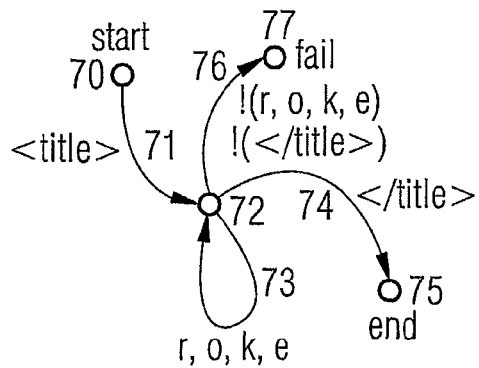
FIG. 8 illustrates an example of filtering web pages having a specific page title.

Another example of filtering data according to the present invention, illustrated in FIG. 8, is in extracting specific page titles. For example, with a pattern:

<title> roke </title> the pair of labels are:

<title> and </title>

The labels are separated by a sequence of characters from the set [roke]. Starting at 70 the sequence <title> 71 takes the search to point 72. At point 72 the characters [roke] (73) loop the search back to point 72. At point 72 the symbols in the set !([roke])!(</title>) 76 take the search to point 77, i.e. the search fails. At point 72 the sequence </title> 74 takes the search to point 75 and ends the search. The identification of the pair of sequences <title> </title> identifies a page title between them. In this instance only titles that contain the characters [roke] in any combination will be extracted.

Figure 9:
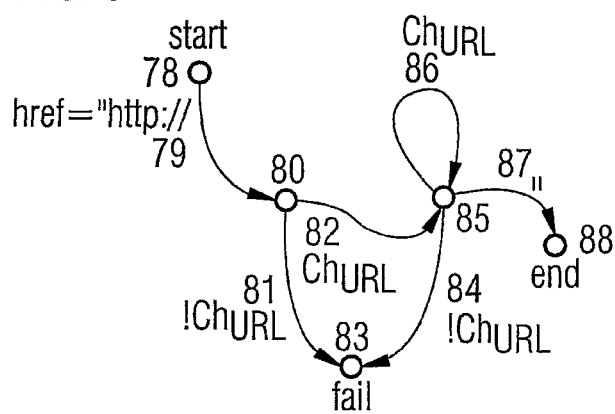
FIG. 9 shows an example of searching for a particular hyperlink.

FIG. 9 shows a filtering example according to the present invention for extracting hyperlinks. The pattern is:
 href="http://www.roke.co.uk"
and in this case the pair of labels are:
 href="http://and"
The labels are separated by a sequence of characters from the valid set of characters [rokecuw.] these characters are defined by the set $Ch_{URL}$. Starting at point 78. The sequence href="http://79 takes the search to point 80. From point 80 a symbol from the set $Ch_{URL}$ (the set of valid URL characters) 82 takes the search to point 85. From point 80 a symbol that is not in the set $Ch_{URL}$ ($!Ch_{URL}$) 81 takes the search to point 83 and the search fails. From point 85 a valid URL character 86 loops the search back to point 85. From point 85 an invalid URL character 84 (i.e. not in the set [rokecuw.) results in failure 83. From point 85 the quote character 87 takes the search to point 88. At which point a valid hyperlink has been found and can be extracted. This instance will only identify hyperlinks that have URLs based on the character set [rokecuw.] and no others.

Figure 10:
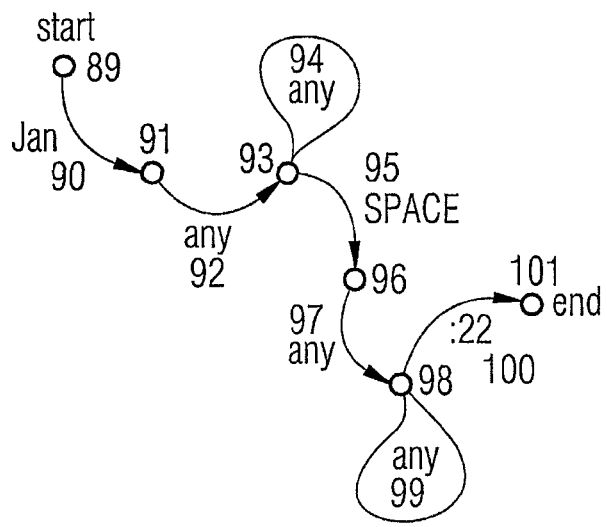
FIG. 10 illustrates an example of filtering for sections containing particular date and time combinations.

FIG. 10 illustrates another example of the present invention, based on a Date—Time format. The pattern is:
 Jan 01 2008 SPACE 10:20:22
In this case a bridge character is needed to link the date and time parts. A suitable bridge is the SPACE character after the year. Starting at point 89, the month Jan 90 moves the search to point 91. From point 91 any character 92 takes the search to point 93. At point 93 any character loops the search back to point 93. At point 93 the SPACE character 95 takes the search to point 96. At point 96 any character 97 takes the search to point 98 and at point 98 any character 99 loops the search back to point 98. At point 98 the sequence:22 100 completes the search 101. This instance identifies and filters out any date starting January that appears with a time ending in 22 seconds.

Figure 11A:
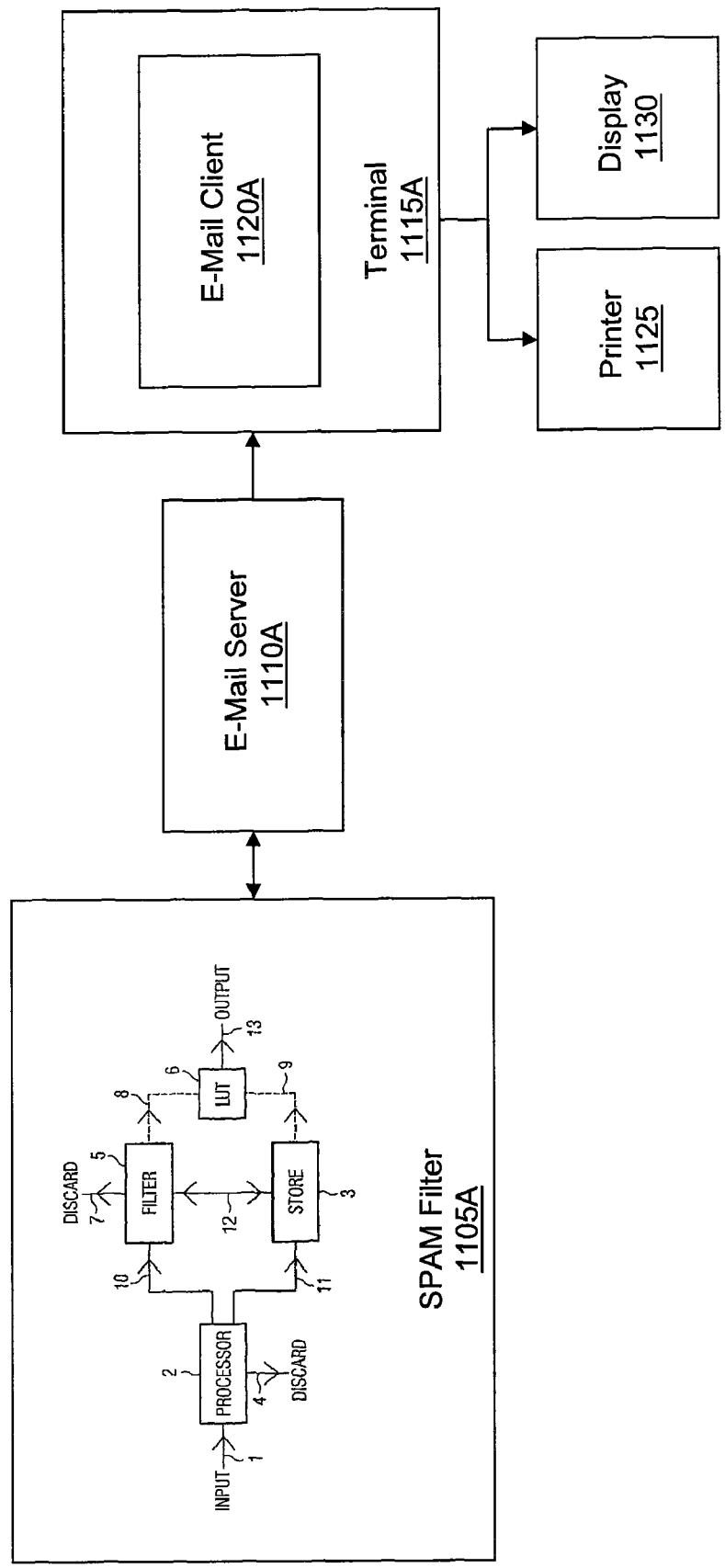
FIGS. 11A-11D illustrate exemplary extraction and filtering arrangements for electronic mail in accordance with the present invention.

FIGS. 11A-11D illustrate exemplary extraction and filtering arrangements for electronic mail in accordance with the present invention. In the arrangement of FIG. 11A a separate filtering and extracting server (e.g., SPAM filter) 1105A is provided for performing the extraction and filtering described above. SPAM filter 1105A can be executed by an application specific integrated circuit (ASIC), microprocessor executing computer code, field programmable gate array and/or the like to perform the extraction and filtering functions. The SPAM filter 1105A is coupled to an e-mail server 110A, which in turn is coupled to a terminal 1115A. Terminal 1115A can be any type of terminal, including a desktop computer, laptop computer and/or a wireless computing device (e.g., a wireless telephone and/or e-mail device). Terminal 111SA includes an e-mail client 1120A for receiving the e-mails that pass from SPAM filter 1105A through e-mail server 1110A to terminal 1115A. Terminal 1115A can include an application specific integrated circuit (ASIC), microprocessor executing computer code, field programmable gate array and/or the like to execute the e-mail client. The e-mails can be output on printer 1125, display 1130 or any other type of output device. In particular, if an e-mail is filtered then it would not be provided to terminal 1115A, whereas those that are not filtered would be provided to the terminal. In other words, the e-mails that are discarded by SPAM filter 1105A are those that are passed to the terminal, whereas those that are output from lookup table 6 are filtered and not passed to the terminal.

Figure 11B:
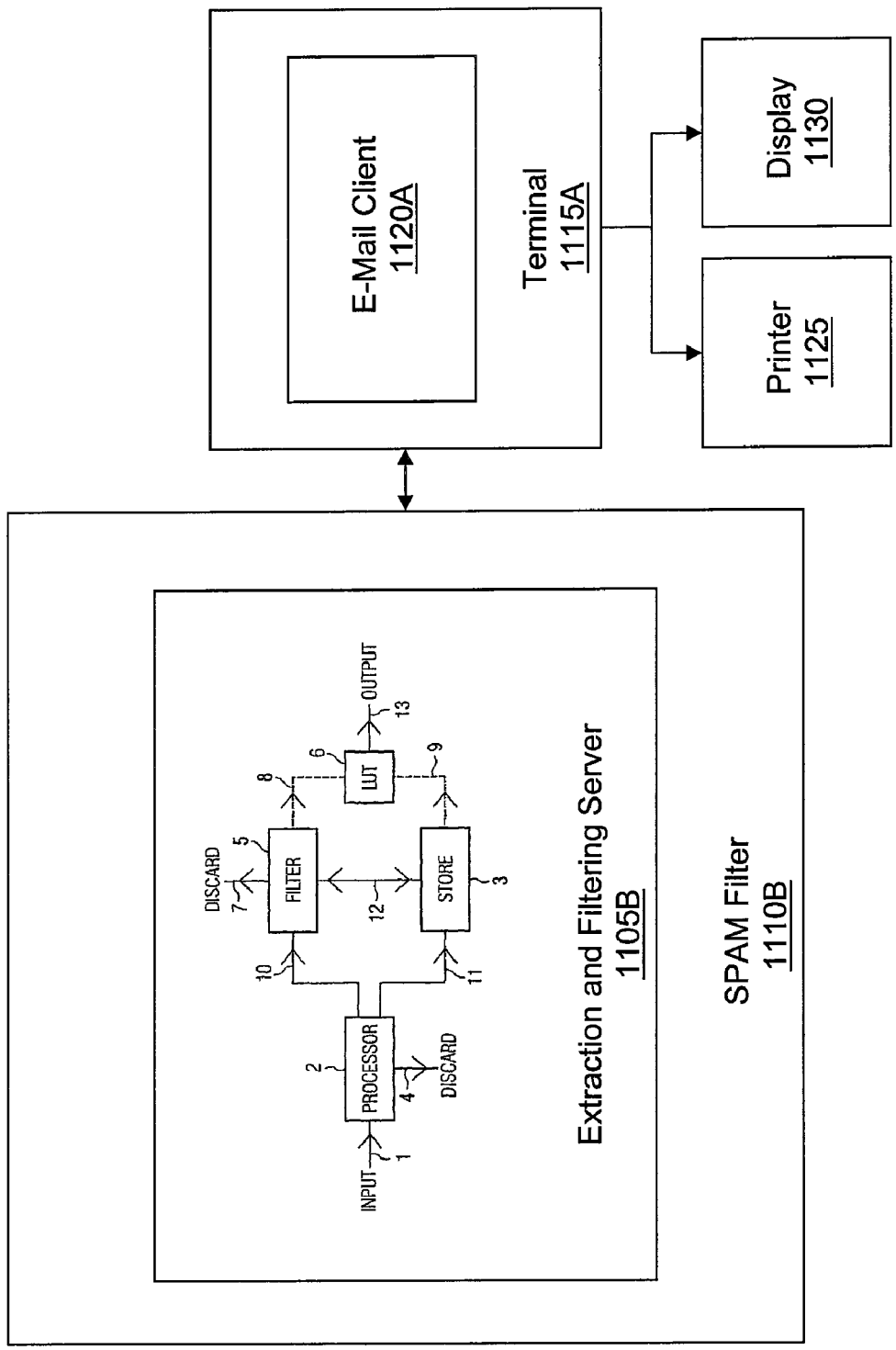

In the arrangement of FIG. 11B SPAM filter 1105B can be included in e-mail server 1110B. In this arrangement SPAM filter 1105B can be a separate program on the same hardware as the e-mail server 1110B and/or can be a program executing within the e-mail server program.

Figure 11C:
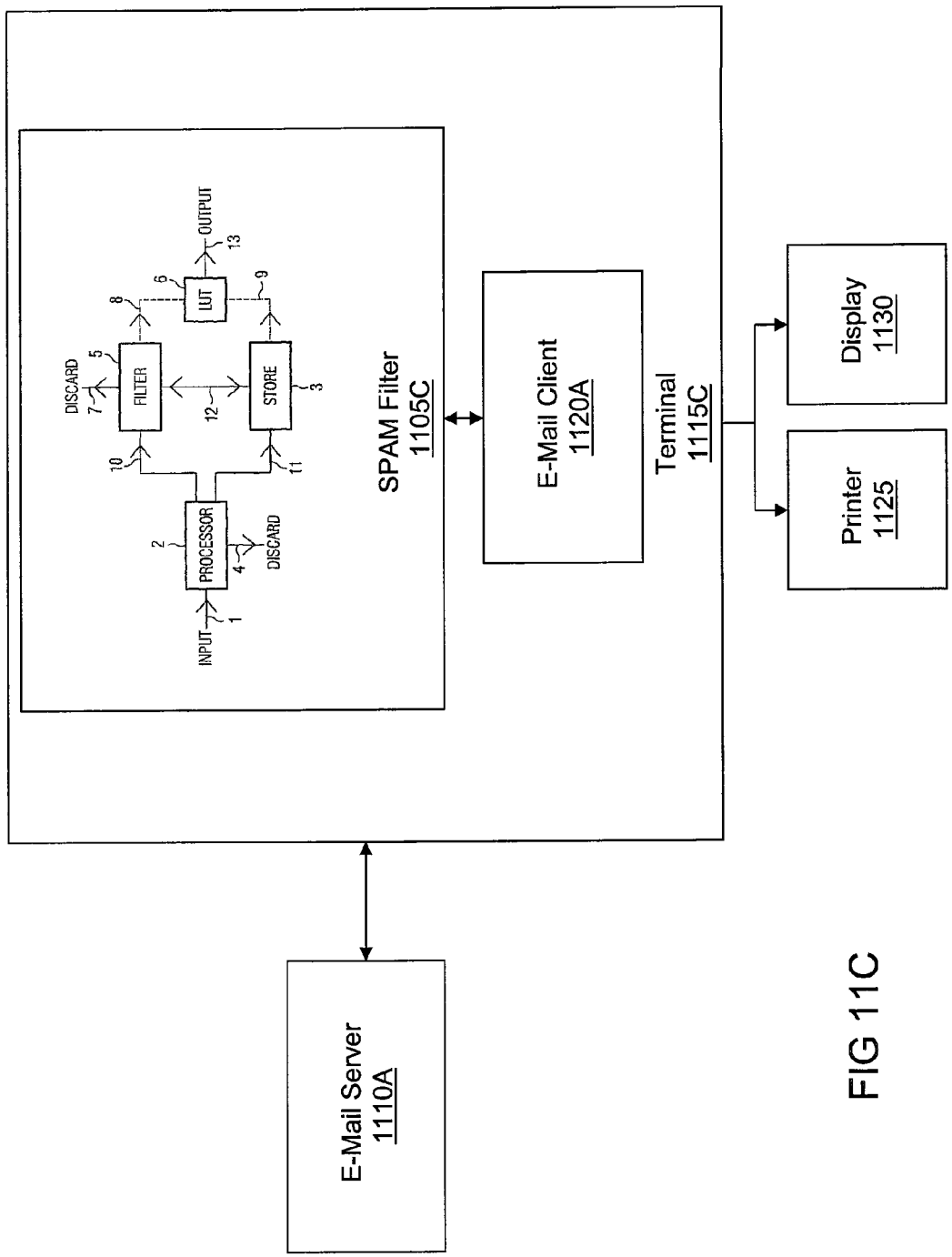

In the arrangement of FIG. 11C SPAM filter 1105C can be included in terminal 1115C. In this arrangement SPAM filter 1105C can be a program executing on terminal 1115C.

Figure 11D:
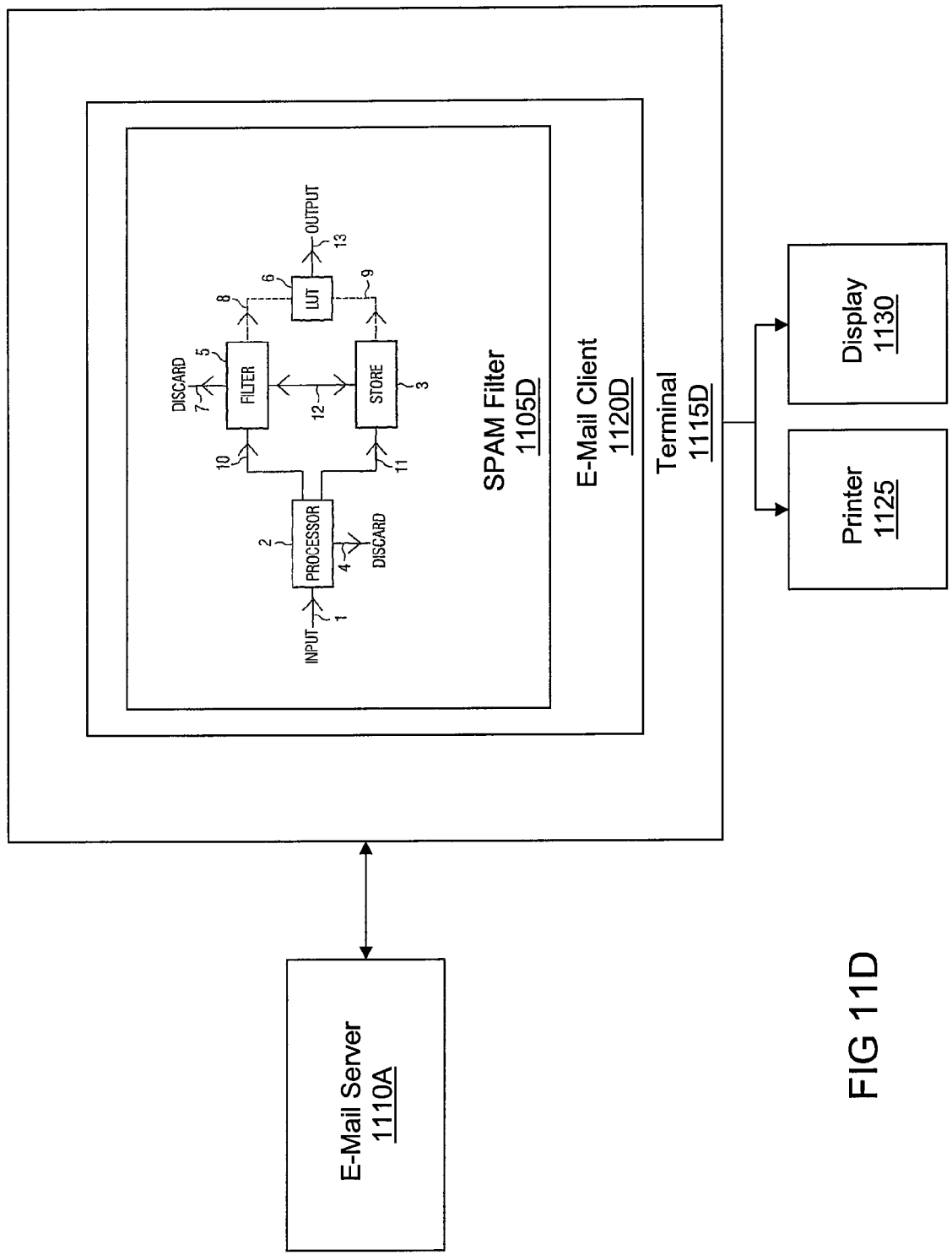

In the arrangement of FIG. 11D SPAM filter 1105D can be included in e-mail client 1120D. In this arrangement SPAM filter 1105D can be, for example, a plug-in for e-mail client 1120D.

Figure 12A:
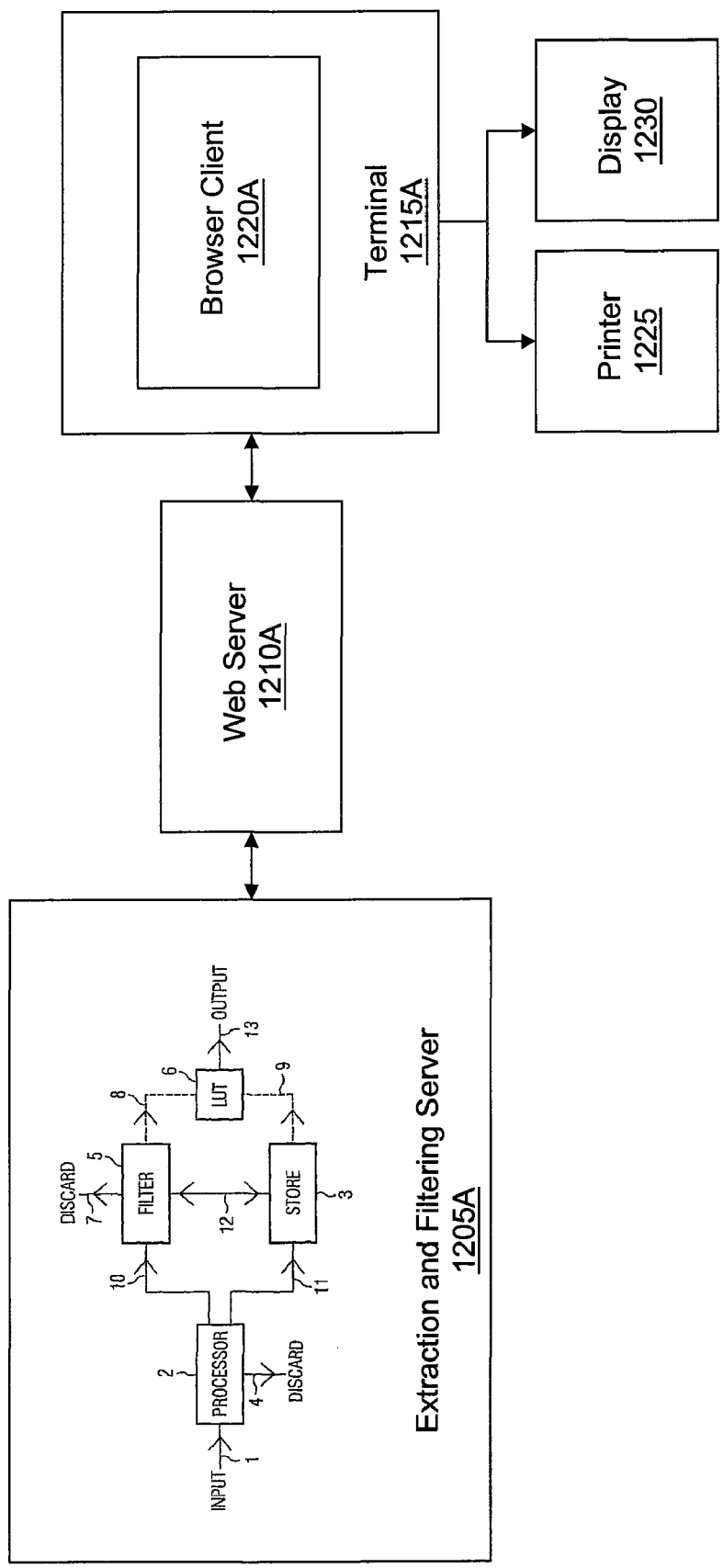
FIGS. 12A-12D illustrate exemplary extraction and filtering arrangements for URLs in accordance with the present invention.

FIGS. 12A-12D illustrate exemplary extraction and filtering arrangements for URLs in accordance with the present invention. In the arrangement of FIG. 12A a separate server 1205A is provided for performing the extraction and filtering described above. Server 1205A can include an application specific integrated circuit (ASIC), microprocessor executing computer code, field programmable gate array and/or the like to perform the extraction and filtering functions. The extraction and filtering server 1205A is coupled to a web server 1210A, which in turn is coupled to a terminal 1215A. Terminal 1215A can be any type of terminal, including a desktop computer, laptop computer and/or a wireless computing device (e.g., a wireless telephone and/or e-mail device). Terminal 1215A includes a browser client 1220A for browsing web pages that pass from the extraction and filtering server 1205A through web server 1210A to client 1215A. Terminal 1215A can include an application specific integrated circuit (ASIC), microprocessor executing computer code, field programmable gate array and/or the like to execute the e-mail client. The filtered web pages can be output on printer 1225, display 1230 or any other type of output device. In particular, if a web page passes through the filter then it would not be provided to terminal 1215A, whereas those that are not filtered would be provided to the terminal. In other words, the web pages that are discarded by the extraction and filtering server 1205A are those that are passed to the terminal, whereas those that are output from lookup table 6 are filtered and not passed to the terminal.

Figure 12B:
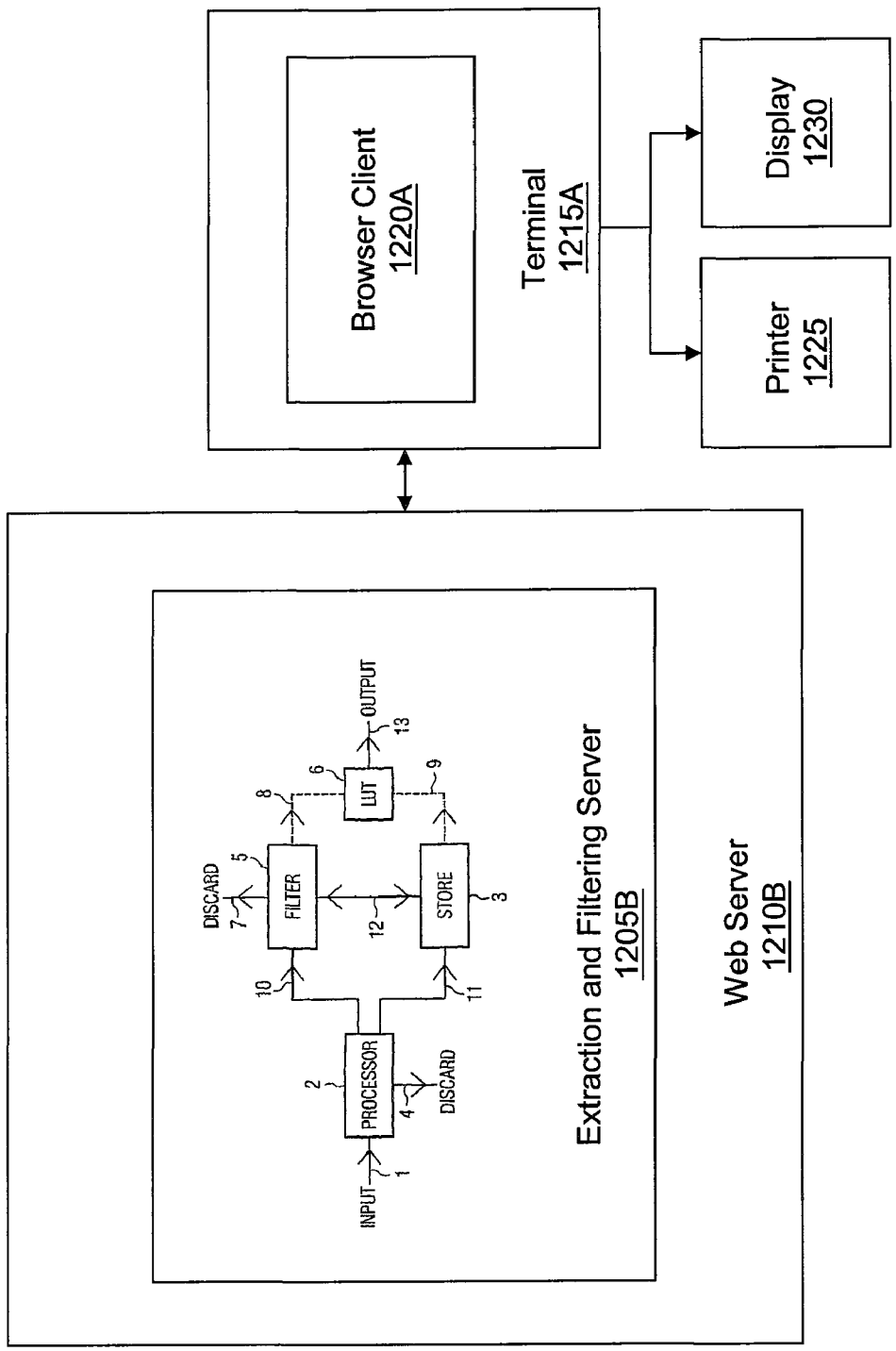

In the arrangement of FIG. 12B extraction and filtering server 1205B can be included in web server 1210B. In this arrangement server 1205B can be a separate server executing on the same hardware as the web server 1210B and/or can be a program executing within the web server program.

Figure 12C:
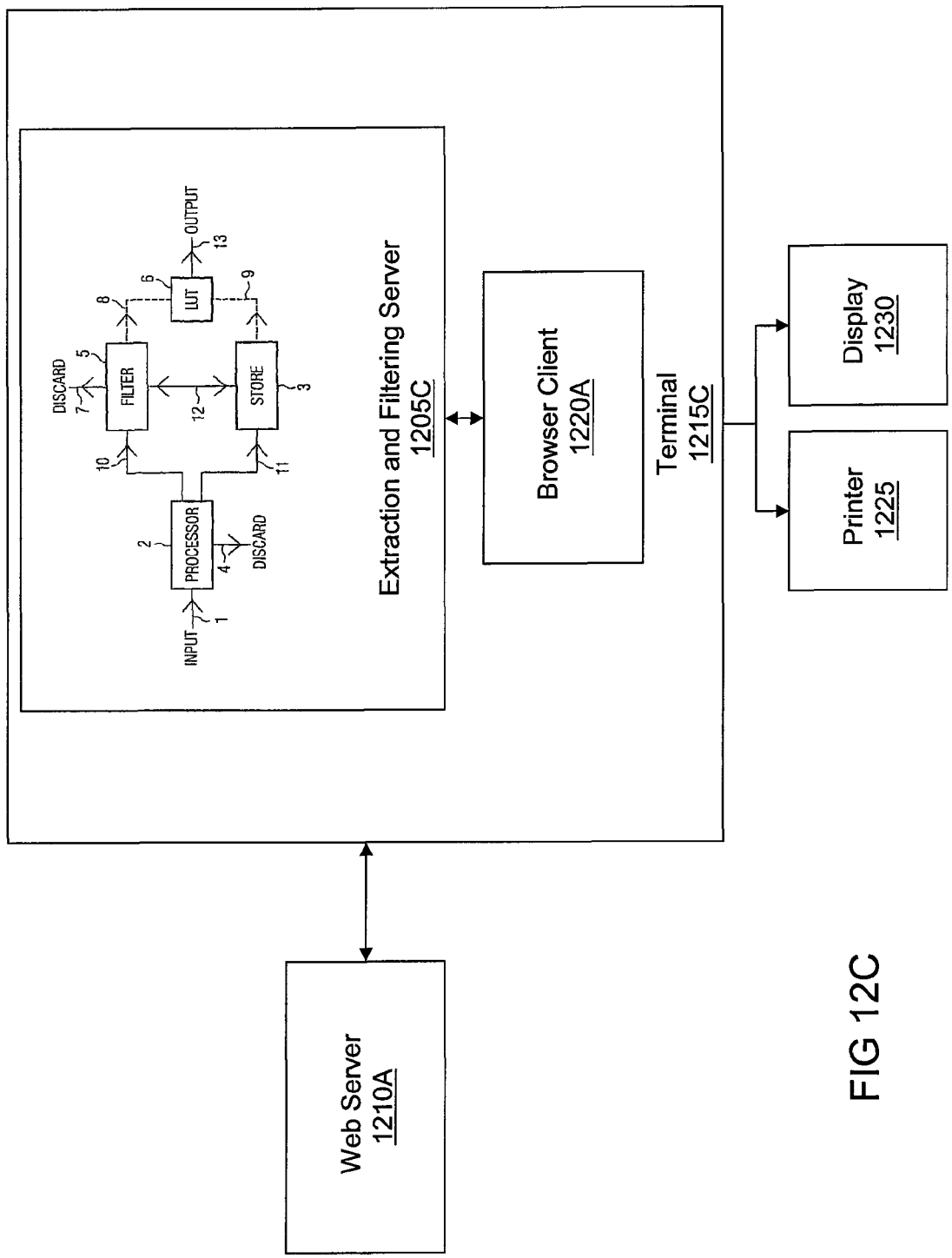

In the arrangement of FIG. 12C extraction and filtering server 1205C can be included in terminal 1215C. In this arrangement server 1205C can be a separate server or can be a program executing on terminal 1215C.

Figure 12D:
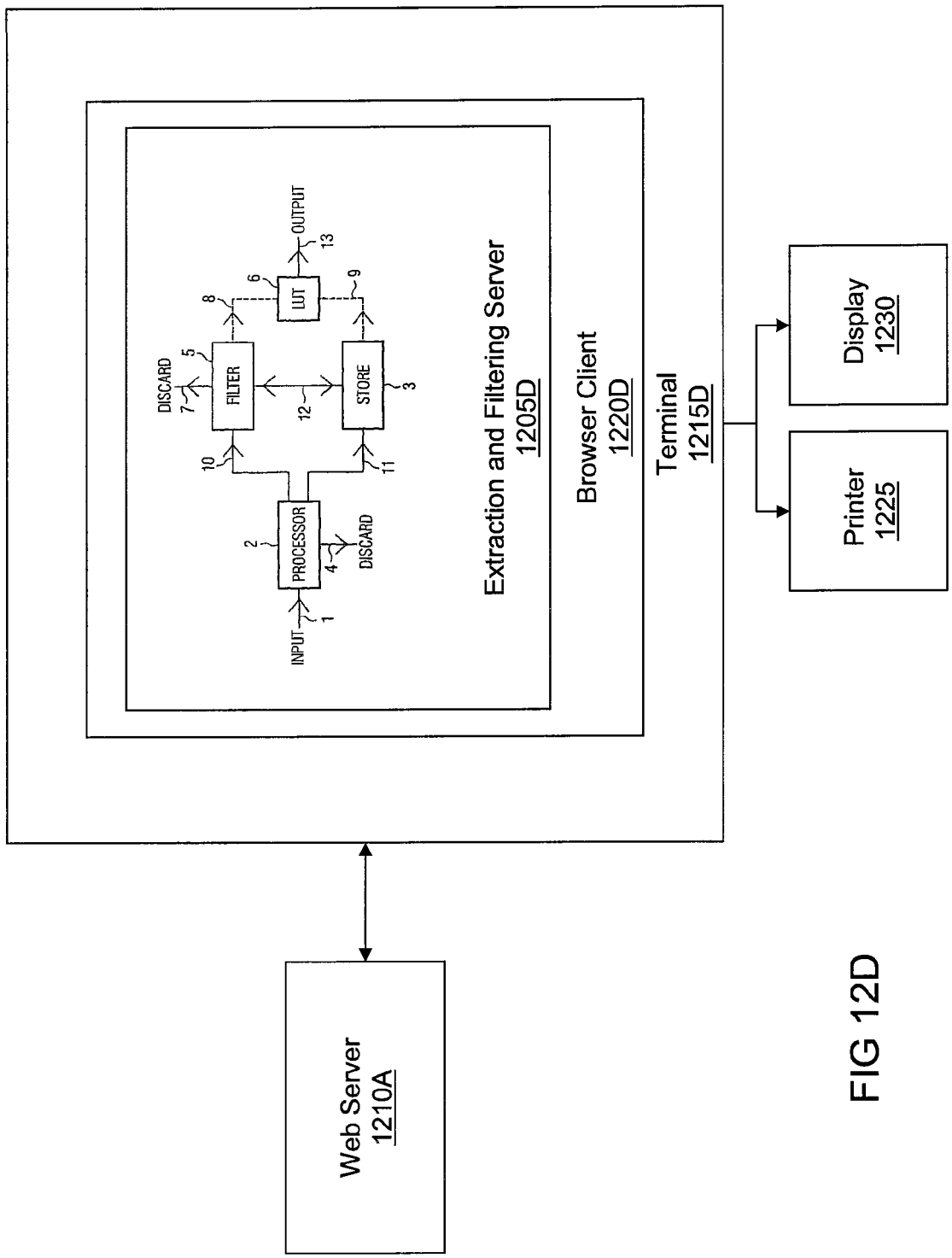

In the arrangement of FIG. 12D extraction and filtering server 1205D can be included in browser client 1220D. In this arrangement server 1205D can be, for example, a plug-in for browser client 1220D.

Although FIGS. 11A-11D and 12A-12D are described in connection with so-called blacklists, in which a match with the lookup table causes the email or web page to be excluded and not delivered to the terminal, the present invention can also be implemented with so-called whitelists. In this case a match with the lookup table allows the email or web page to be delivered to the terminal and a failure to match with the lookup table excludes the email or web page from being delivered.

It will be recognized from the discussion of FIGS. 11A-11D and 12A-12D above that the designation of the filtering and extraction element as being a server is used to cover a variety of different arrangements, including a physical server, a server program, a regular executable program and a plug-in program. Accordingly, the term server should be interpreted accordingly in connection with the claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of data extraction comprising:
   extracting sections of a data stream;
   testing each extracted section of the data stream for the presence of the set of characters of interest, wherein the set of characters of interest comprises at least a prefix sequence of characters, a bridge, and a suffix sequence of characters;
   comparing extracted sections in which at least one of the characters of the set of characters of interest is present with stored identifiers;
   storing any extracted sections that match one of the stored identifiers; and
   discarding any extracted sections that do not match one of the stored identifiers, wherein the testing includes comparing first and last characters of an extracted section with first and last characters of the set of characters of interest and wherein the comparing of the extracted sections with the stored identifiers occurs when the testing results in a match between the first and last characters of the extracted section and the first and last characters of the set of characters of interest.

2. A method according to claim 1, wherein:
   the step of testing further comprise testing each extracted section of the data stream for the presence of a further set of character of interest; and
   the step of comparing the extracted sections with the stored identifiers comprises comparing the extracted sections in which at least one of the characters of the set of characters of interest and at least one of the characters of the further set of characters of interest is present with at least one of the stored identifiers.

3. A method according to claim 1, wherein the testing of each extracted section is performed based on a predetermined order of the set of characters.

4. A method according to claim 1, wherein a skip function is applied in which only predetermined characters in each extracted section are tested against the set of characters of interest.

5. A method according to claim 1, wherein the method comprises:
   determining additional sets of characters of interest and testing for one or more of the set of characters in more than one set.

6. A method according to claim 1, wherein each extracted section comprises an end point identifier.

7. A method according to claim 1, wherein the stored extracted sections are stored in a store.

8. A method according to claim 1, wherein the step of comparing the extracted sections in which at least one of the characters of the set of characters of interest is present with extracted sections in which at least one of the characters of the set of characters of interest is present with the stored identifiers includes the step of:
   inputting the extracted sections to a look up table.

9. The method of claim 1, wherein the comparing, testing and extracting are performed by an extraction and filtering server.

10. The method of claim 9, wherein the extraction and filtering server is a stand-alone server, a component of an e-mail server, a component of a terminal or a component of an e-mail client.

11. The method of claim 10, comprising:
    comparing the extracted section in which at least one of the characters of the set of characters of interest are present with a lookup table of email addresses; and
    filtering a first email in which the extracted section in which at least one of the characters of the set of characters of interest are present match email addresses in the lookup table.

12. The method of claim 11, wherein the filtered first email are not passed to an e-mail client.

13. The method of claim 11, wherein when a second email does not include any of the characters of interest the second email is passed to an e-mail client.

14. The method of claim 11, wherein a second email is passed to an e-mail client when the second email does not include any of the characters of interest or when the second e-mail includes the extracted section in which at least one of the characters of the set of characters of interest are present do not match an email address in the lookup table.

* * * * *